US012589935B2

(12) United States Patent
Ueno et al.

(10) Patent No.: US 12,589,935 B2
(45) Date of Patent: Mar. 31, 2026

(54) HEAT-RESISTANT CONTAINER

(71) Applicant: KYOCERA Corporation, Kyoto (JP)

(72) Inventors: Takahiro Ueno, Kirishima (JP);
Kentaro Kikuchi, Kirishima (JP);
Satoshi Toyoda, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 530 days.

(21) Appl. No.: 18/013,185

(22) PCT Filed: Jun. 25, 2021

(86) PCT No.: PCT/JP2021/024102
§ 371 (c)(1),
(2) Date: Dec. 27, 2022

(87) PCT Pub. No.: WO2022/004582
PCT Pub. Date: Jan. 6, 2022

(65) Prior Publication Data
US 2023/0242324 A1    Aug. 3, 2023

(30) Foreign Application Priority Data

Jun. 30, 2020    (JP) ................................. 2020-113285

(51) Int. Cl.
*C04B 35/10* (2006.01)
*B65D 81/38* (2006.01)

(52) U.S. Cl.
CPC .......... *B65D 81/3813* (2013.01); *C04B 35/10* (2013.01); *C04B 2235/3206* (2013.01); *C04B 2235/3217* (2013.01); *C04B 2235/3418* (2013.01); *C04B 2235/442* (2013.01)

(58) Field of Classification Search
CPC ....... C04B 2111/00413; C04B 38/0074; C04B 2235/77; C04B 2235/775
See application file for complete search history.

(56) References Cited

U.S. PATENT DOCUMENTS

2009/0214850 A1    8/2009   Hara et al.
2012/0225270 A1*   9/2012   Basoli ................. C04B 38/0077
                                                          428/213

FOREIGN PATENT DOCUMENTS

CN        110950664 A      4/2020
JP        S56-17976 A      2/1981
JP        2003-40688 A     2/2003
JP        2006-36624 A     2/2006
JP        2009-179509 A    8/2009
                    (Continued)

*Primary Examiner* — Laura A Auer

(74) *Attorney, Agent, or Firm* — Procopio, Cory, Hargreaves & Savitch LLP

(57) ABSTRACT

A heat-resistant container according to the present disclosure includes a first wall portion constituting a sidewall and a second wall portion constituting an upper wall or bottom wall. The first wall portion and the second wall portion are made of a ceramic. The first wall portion has a large number of pores therein. In cross sections of the first wall portion, a porosity Pr1 is smaller than a porosity Pr2, where Pr1 is a porosity in a cross section of the first wall portion orthogonal to a wall surface of the first wall portion and parallel to a height direction of the first wall portion, and Pr2 is a porosity in a cross section of the first wall portion orthogonal to the wall surface of the first wall portion and parallel to a width direction of the first wall portion.

10 Claims, 9 Drawing Sheets

(56) References Cited

FOREIGN PATENT DOCUMENTS

| JP | 2014-73932 | A | 4/2014 |
| JP | 2016-84260 | A | 5/2016 |
| JP | 2016-205638 | A | 12/2016 |

* cited by examiner

| | | EXCLUSION AREA 0 (µM)² | | | | | EXCLUSION AREA 30 (µM)² | | | | | EXCLUSION AREA 100 (µM)² | | | | |
|---|---|---|---|---|---|---|---|---|---|---|---|---|---|---|---|---|
| | | POROSITY (%) | DISTANCE BETWEEN GRAVITY CENTERS (µm) | DEGREE OF CIRCULARITY | EQUIVALENT CIRCLE DIAMETER (µm) | ASPECT RATIO | POROSITY (%) | DISTANCE BETWEEN GRAVITY CENTERS (µm) | DEGREE OF CIRCULARITY | EQUIVALENT CIRCLE DIAMETER (µm) | ASPECT RATIO | POROSITY (%) | DISTANCE BETWEEN GRAVITY CENTERS (µm) | DEGREE OF CIRCULARITY | EQUIVALENT CIRCLE DIAMETER (µm) | ASPECT RATIO |
| HEIGHT DIRECTION (VERTICAL CROSS SECTION) — UPPER PORTION | INNER WALL SURFACE SIDE | 4.3 | 12.8 | 0.78 | 2.39 | 1.60 | 2.4 | 54.2 | 0.46 | 8.95 | 1.47 | - | - | 0.27 | 15.26 | 1.54 |
| | INNER PORTION | 5.2 | 12.5 | 0.78 | 2.44 | 1.59 | 3.1 | 51.8 | 0.44 | 9.34 | 1.45 | - | - | 0.31 | 15.78 | 1.55 |
| | OUTER WALL SURFACE SIDE | 4.7 | 12.3 | 0.78 | 2.37 | 1.60 | 2.6 | 55.1 | 0.45 | 9.47 | 1.44 | - | - | 0.32 | 15.52 | 1.52 |
| | AVERAGE | 4.7 | 12.5 | 0.78 | 2.40 | 1.60 | 2.7 | 53.7 | 0.45 | 9.30 | 1.45 | - | - | 0.30 | 15.52 | 1.54 |
| CENTER PORTION | INNER WALL SURFACE SIDE | 4.0 | 14.3 | 0.78 | 2.57 | 1.56 | 2.2 | 55.0 | 0.47 | 8.69 | 1.47 | - | - | 0.29 | 14.27 | 1.53 |
| | INNER PORTION | 4.7 | 12.8 | 0.78 | 2.41 | 1.56 | 2.8 | 54.9 | 0.43 | 9.09 | 1.45 | - | - | 0.27 | 15.59 | 1.46 |
| | OUTER WALL SURFACE SIDE | 4.4 | 13.2 | 0.76 | 2.29 | 1.56 | 2.4 | 54.6 | 0.43 | 9.07 | 1.44 | - | - | 0.27 | 15.55 | 1.54 |
| | AVERAGE | 4.4 | 13.4 | 0.78 | 2.40 | 1.57 | 2.4 | 54.8 | 0.44 | 8.90 | 1.45 | - | - | 0.28 | 15.14 | 1.51 |
| LOWER PORTION | INNER WALL SURFACE SIDE | 4.2 | 13.7 | 0.78 | 2.44 | 1.58 | 2.4 | 57.1 | 0.47 | 11.02 | 1.44 | - | - | 0.34 | 16.20 | 1.43 |
| | INNER PORTION | 5.2 | 12.9 | 0.78 | 2.18 | 1.62 | 2.8 | 50.8 | 0.45 | 11.68 | 1.42 | - | - | 0.35 | 16.28 | 1.46 |
| | OUTER WALL SURFACE SIDE | 4.7 | 13.1 | 0.79 | 2.46 | 1.57 | 2.5 | 52.0 | 0.47 | 8.54 | 1.42 | - | - | 0.24 | 13.80 | 1.49 |
| | AVERAGE | 4.7 | 13.2 | 0.78 | 2.40 | 1.59 | 2.6 | 53.3 | 0.46 | 10.40 | 1.43 | - | - | 0.31 | 15.43 | 1.46 |

FIG. 8

| | | EXCLUSION AREA 0 (µm)² | | | | | EXCLUSION AREA 30 (µm)² | | | | | EXCLUSION AREA 100 (µm)² | | | | |
| | | POROSITY (%) | DISTANCE BETWEEN GRAVITY CENTERS (µm) | DEGREE OF CIRCULARITY | EQUIVALENT CIRCLE DIAMETER (µm) | ASPECT RATIO | POROSITY (%) | DISTANCE BETWEEN GRAVITY CENTERS (µm) | DEGREE OF CIRCULARITY | EQUIVALENT CIRCLE DIAMETER (µm) | ASPECT RATIO | POROSITY (%) | DISTANCE BETWEEN GRAVITY CENTERS (µm) | DEGREE OF CIRCULARITY | EQUIVALENT CIRCLE DIAMETER (µm) | ASPECT RATIO |
|---|---|---|---|---|---|---|---|---|---|---|---|---|---|---|---|---|---|
| WIDTH DIRECTION (HORIZONTAL CROSS SECTION) UPPER PORTION | INNER WALL SURFACE SIDE | 10.3 | 18.44 | 0.72 | 4.82 | 1.53 | 9.4 | 38.0 | 0.46 | 12.76 | 1.46 | | | 0.38 | 17.59 | 1.46 |
| | INNER PORTION | 11.4 | 17.76 | 0.74 | 4.63 | 1.53 | 10.2 | 38.9 | 0.46 | 13.18 | 1.48 | | | 0.38 | 18.27 | 1.47 |
| | OUTER WALL SURFACE SIDE | 11.3 | 15.40 | 0.74 | 3.70 | 1.53 | 10.6 | 35.1 | 0.42 | 12.19 | 1.46 | | | 0.33 | 17.39 | 1.48 |
| | AVERAGE | 11.0 | 17.20 | 0.73 | - | 1.53 | 10.1 | 37.3 | 0.45 | 12.70 | 1.47 | | | 0.37 | 17.75 | 1.47 |
| CENTER PORTION | INNER WALL SURFACE SIDE | 10.4 | 15.51 | 0.73 | 4.10 | 1.52 | 9.0 | 33.9 | 0.46 | 11.28 | 1.46 | | | 0.37 | 15.98 | 1.48 |
| | INNER PORTION | 10.5 | 15.56 | 0.73 | 4.08 | 1.54 | 9.2 | 33.7 | 0.47 | 11.27 | 1.46 | | | 0.36 | 16.07 | 1.50 |
| | OUTER WALL SURFACE SIDE | 11.0 | 14.94 | 0.73 | 3.94 | 1.53 | 9.5 | 33.6 | 0.46 | 11.35 | 1.45 | | | 0.36 | 16.25 | 1.46 |
| | AVERAGE | 10.6 | 15.30 | 0.73 | - | 1.53 | 9.3 | 33.7 | 0.46 | 11.30 | 1.46 | | | 0.36 | 16.10 | 1.48 |
| LOWER PORTION | INNER WALL SURFACE SIDE | 10.0 | 14.77 | 0.73 | 3.79 | 1.52 | 8.6 | 33.9 | 0.47 | 11.02 | 1.44 | | | 0.34 | 16.20 | 1.47 |
| | INNER PORTION | 10.9 | 14.96 | 0.73 | 3.90 | 1.53 | 9.5 | 34.5 | 0.45 | 11.68 | 1.43 | | | 0.35 | 16.28 | 1.46 |
| | OUTER WALL SURFACE SIDE | 11.0 | 15.23 | 0.73 | 4.05 | 1.53 | 9.6 | 34.1 | 0.45 | 11.76 | 1.46 | | | 0.36 | 16.36 | 1.42 |
| | AVERAGE | 10.6 | 15.00 | 0.73 | - | 1.53 | 9.2 | 34.2 | 0.46 | 11.50 | 1.44 | | | 0.35 | 16.28 | 1.45 |

FIG. 9

HEAT-RESISTANT CONTAINER

CROSS-REFERENCE TO RELATED APPLICATIONS

This application is national stage application of International Application No. PCT/JP2021/024102, filed on Jun. 25, 2021, which designates the United States, incorporated herein by reference, and which claims the benefit of priority from Japanese Patent Application No. 2020-113285, filed on Jun. 30, 2020, the entire contents of which are incorporated herein by reference.

TECHNICAL FIELD

The present disclosure relates to a heat-resistant container.

BACKGROUND OF INVENTION

Ceramics are widely used in heat-resistant containers from a perspective of heat-resistant properties.

CITATION LIST

Patent Literature

Patent Document 1: JP 2003-040688A

SUMMARY

In an embodiment of the present disclosure, a heat-resistant container includes a first wall portion constituting a side wall and a second wall portion constituting an upper wall or a bottom wall. The first wall portion and the second wall portion are made of a ceramic. The first wall portion has a large number of pores therein. In cross sections of the first wall portion, a porosity $Pr1$ is smaller than a porosity $Pr2$, where $Pr1$ is a porosity in a cross section of the first wall portion orthogonal to a wall surface of the first wall portion and parallel to a height direction of the first wall portion, and $Pr2$ is a porosity in a cross section of the first wall portion orthogonal to the wall surface of the first wall portion and parallel to a width direction of the first wall portion.

BRIEF DESCRIPTION OF THE DRAWINGS

FIG. 8 is a table showing measurement results of aspect ratio, porosity, distance between gravity centers, degree of circularity, and equivalent circle diameter of a vertical cross section of the first wall portion.

FIG. 9 is a table showing measurement results of aspect ratio, porosity, distance between gravity centers, degree of circularity, and equivalent circle diameter of a horizontal cross section of the first wall portion.

DESCRIPTION OF EMBODIMENTS

Modes (hereinafter, referred to as "embodiments") for implementing a heat-resistant container according to the present disclosure will be described in detail below with reference to the accompanying drawings. The embodiments described below do not intend to limit the heat-resistant container according to the present disclosure. In addition, embodiments can be appropriately combined so as not to contradict each other in terms of processing content. In the following embodiments, the same portions are denoted by the same reference signs, and overlapping explanations are omitted.

In the embodiments described below, expressions such as "constant", "orthogonal", "vertical", and "parallel" may be used, but these expressions do not need to be exactly "constant", "orthogonal", "vertical", and "parallel". In other words, it is assumed that the above expressions allow deviations in manufacturing accuracy, installation accuracy, or the like.

A heat-resistant container made of a ceramic having excellent thermal shock resistance is desired, such as a ceramic member exposed to high-temperature molten metal or a ceramic member used in the combustion chamber or a fuel injection nozzle of an internal combustion engine.

The present disclosure has been made in view of the above, and provides a heat-resistant container having excellent thermal shock resistance.

Figure 1:
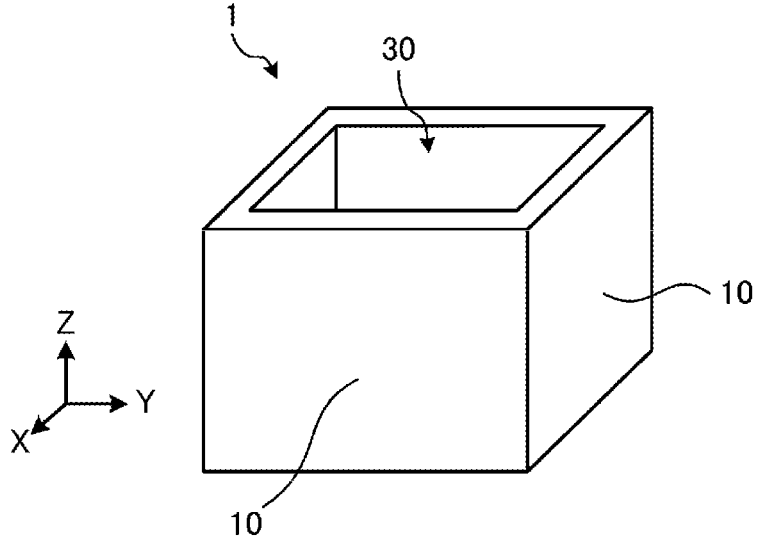
FIG. 1 is a schematic perspective view of a heat-resistant container according to an embodiment.
Figure 2:
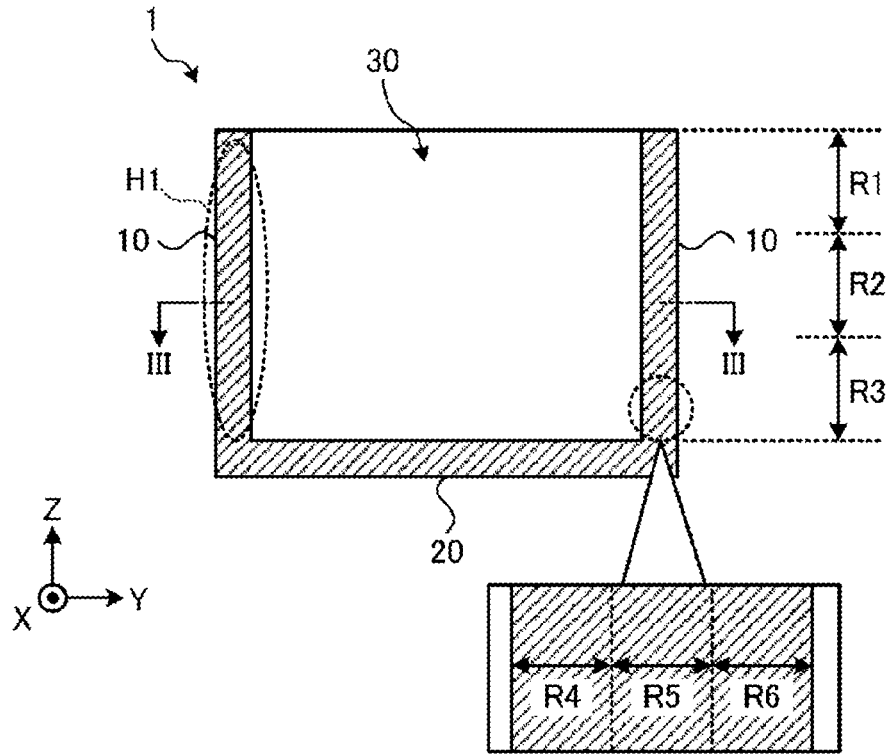
FIG. 2 is a vertical cross-sectional view of the heat-resistant container according to the embodiment.
Figure 3:
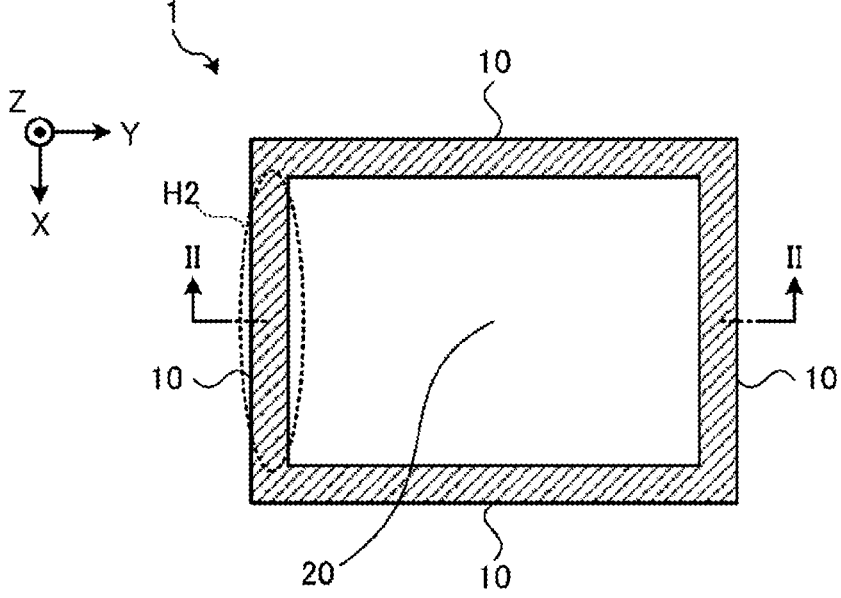
FIG. 3 is a horizontal cross-sectional view of the heat-resistant container according to the embodiment.

FIG. 1 is a schematic perspective view of a heat-resistant container according to an embodiment. FIG. 2 is a vertical cross-sectional view of the heat-resistant container according to the embodiment. FIG. 3 is a horizontal cross-sectional view of the heat-resistant container according to the embodiment.

As illustrated in FIGS. 1 to 3, a heat-resistant container 1 according to the embodiment includes a plurality of (in this case, four) first wall portions 10 and a second wall portion 20. The heat-resistant container 1 has an opening portion 30 opposite to the second wall portion 20. In the embodiment, the second wall portion 20 constitutes a bottom wall of the heat-resistant container 1. Although the second wall portion 20 is provided herein to constitute the bottom wall of the heat-resistant container 1, the second wall portion 20 is not limited thereto, and may constitute an upper wall of the heat-resistant container 1. That is, the heat-resistant container 1 may be upside down from the state illustrated in FIG. 1.

The second wall portion 20 has a quadrangular shape in plan view (see FIG. 3). Here, the quadrangular shape is not limited to a rectangle as illustrated in FIG. 3, and may be a square. The four first wall portions 10 constitute the sidewall of the heat-resistant container 1 and are connected to the second wall portion 20. The shape of the second wall portion 20 in plan view is not limited to the quadrangular shape, and may be, for example, a circular shape.

The heat-resistant container 1 according to the embodiment stores a high-temperature substance. For example, the heat-resistant container 1 may be used as a container of molten metal. In this case, the molten metal is injected from above or through an opening portion 30 to the heat-resistant container 1. Alternatively, the heat-resistant container 1 may be used as a ladle, for example, to scoop up the molten metal.

Hereinafter, expressions such as "height direction of the first wall portion 10" and "width direction of the first wall portion 10" may be used in the present specification. The "height direction of the first wall portion 10" refers to a Z-direction which is a direction extending from the second wall portion 20 to the opening portion 30 or vice versa. The "width direction of the first wall portion 10" refers to a direction from one of the two adjacent first wall portions 10 to the other. For example, the width direction of the first wall portion 10 having its wall surface orthogonal to an X-axis direction corresponds to a Y-axis direction, and the width direction of the first wall portion 10 having its wall surface orthogonal to the Y-axis direction corresponds to the X-axis direction.

FIG. 2 illustrates a cross section of the heat-resistant container 1 that is orthogonal to the wall surface of the first wall portions 10 and parallel to the height direction of the first wall portions 10. FIG. 3 illustrates a cross section of the heat-resistant container 1 that is orthogonal to the wall surface of the first wall portions 10 and parallel to the width direction of the first wall portions 10.

In the present specification, each of the first wall portions 10 is divided into three equal portions in the height direction, and a region closest to the opening portion 30 is referred to as an upper portion R1 of the first wall portion 10, and a region closest to the second wall portion 20 is referred to as a lower portion R3 of the first wall portion 10. A region between the upper portion R1 and the lower portion R3 of the first wall portion 10 of the three equal portions of the height of the first wall portion 10 is referred to as a center portion R2.

In addition, in the present specification, each of the first wall portions 10 is divided into three equal portions in a thickness direction, and a region closest to the interior of the heat-resistant container 1, that is, a region on the inner wall side of the first wall portion 10 is referred to as an inner wall surface side portion R4 of the first wall portion 10. Of the three equal portions in the thickness direction of the first wall portion 10, a region closest to the exterior of the heat-resistant container 1, that is, a region on the outer wall side of the first wall portion 10 is referred to as an outer wall surface side portion R6 of the first wall portion 10. A region between the inner wall surface side portion R4 and the outer wall surface side portion R6 of the first wall portion 10 of the three equal portions of the thickness of the first wall portion 10 is referred to as an inner portion R5.

The heat-resistant container 1 according to the embodiment is made of a ceramic. Examples of the ceramic composing the heat-resistant container 1 include an aluminum oxide ceramic, a silicon nitride ceramic, an aluminum nitride ceramic, or a silicon carbide ceramic.

The heat-resistant container 1 made of an aluminum oxide ceramic exhibits excellent mechanical characteristics while being relatively inexpensive in terms of raw material cost and manufacturing cost as well. Furthermore, the heat-resistant container 1 made of an aluminum oxide ceramic is less likely to contaminate the natural environment when discarded.

As used herein, the aluminum oxide ceramic, for example, is a material containing at least 70 mass % aluminum oxide out of 100 mass % of the total components constituting the ceramic material.

For example, a method below can be used to confirm the material of the heat-resistant container 1. First, a heat-resistant container 1 to be confirmed is measured using an X-ray diffractometer (XRD), and an obtained value of $2\theta$ (where $2\theta$ indicates a diffraction angle) is checked against JCPDS cards. Next, a quantitative analysis of aluminum (Al) is performed using an ICP emission spectrophotometer (ICP) or an X-ray fluorescent (XRF) analyzer. Then, the content percentage of Al measured by ICP or XRF is converted to a content percentage of aluminum oxide ($Al_2O_3$). When the content percentage of Al is 70 mass % or greater, it is confirmed that the heat-resistant container 1 is made of an aluminum oxide-based ceramic material.

Figure 4:
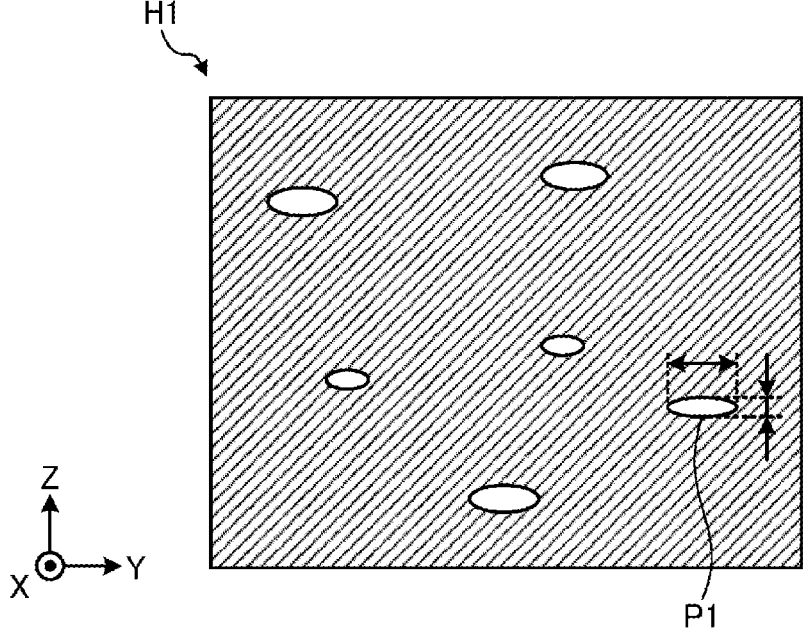
FIG. 4 is a schematic enlarged view of a portion H1 illustrated in FIG. 2.
Figure 5:
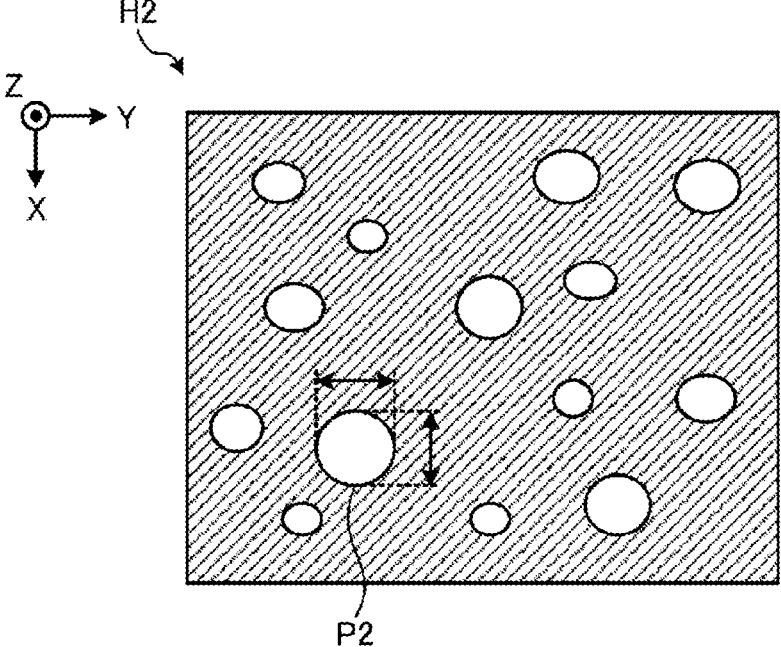
FIG. 5 is a schematic enlarged view of a portion H2 illustrated in FIG. 3.

The first wall portions 10 according to the embodiment have a large number of pores inside. This is described with reference to FIGS. 4 and 5. FIG. 4 is a schematic enlarged view of a portion H1 illustrated in FIG. 2. FIG. 5 is a schematic enlarged view of a portion H2 illustrated in FIG. 3.

In the following, "P1" indicates pores that appear in the cross section illustrated in FIG. 4, that is, the cross section orthogonal to the wall surface of the first wall portions 10 and parallel to the height direction of the first wall portions 10 (see FIG. 2), and a porosity of the cross section is referred to as "Pr1."

"P2" indicates pores that appear in the cross section illustrated in FIG. 5, that is, the cross section orthogonal to the wall surface of the first wall portions 10 and parallel to the width direction of the first wall portions 10 (see FIG. 3), and a porosity of the cross section is referred to as "Pr2." In FIG. 4, only one of the plurality of pores P1 is marked with a reference sign. This is also true for FIG. 5.

As illustrated in FIGS. 4 and 5, the porosity Pr1 is smaller than Pr2 in the heat-resistant container 1 according to the embodiment.

When a hot molten metal is put in a low-temperature ceramic container or the temperature of the low-temperature container is rapidly raised, the ceramic container receives thermal shock. Once the ceramic container receives thermal shock, heat is transferred along the wall surfaces of the container as well as from the surface to the interior of the container. In this case, if heat is transferred easily from the surface to the interior of the ceramic container, cracks tend to be generated inside the ceramic container due to the thermal shock. For this reason, it is preferable to facilitate conduction of generated heat along the wall surface of the ceramic container. As in the heat-resistant container 1 according to the embodiment, if the porosity Pr1 (see FIGS. 2 and 4) is smaller than the porosity Pr2 (see FIGS. 3 and 5), the heat tends to transmit more easily in the height direction (Z-axis direction) of the first wall portions 10. This decreases the likelihood of generation of cracks inside the first wall portions 10 of the heat-resistant container 1 according to the embodiment. In other words, the heat-resistant container 1 according to the embodiment has excellent thermal shock resistance.

The ceramic composing the heat-resistant container 1 according to the embodiment is a dense ceramic. The dense ceramic is a ceramic having a porosity of approximately 17% or less for both Pr1 and Pr2. Both porosities Pr1 and Pr2 of the first wall portions 10 according to the embodiment are in a range from 1 to 17%. Since the porosity Pr1 is different from the porosity Pr2, as described above, the dense ceramic may be defined by the average porosity of Pr1 and Pr2. In this case, the average porosity of Pr1 and Pr2 preferably in a range from 2 to 13%.

In the heat-resistant container 1 according to the embodiment, the porosity Pr2 in the upper portion R1 (see FIG. 2) of the first wall portion 10 is greater than the porosity Pr2 in the lower portion R3 (see FIG. 2) of the first wall portions 10. In other words, the porosity Pr2 on the opening portion 30 side is larger than Pr2 on the second wall portion 20 side.

Here, when the heat-resistant container 1 is used as a container for the molten metal, about 60 to 70% of the total volume of the heat-resistant container 1 may be filled with the molten metal. That is, when the molten metal is introduced into the heat-resistant container 1, the lower portion R3 of the first wall portion 10 is always in contact with the molten metal, but the upper portion R1 of the first wall portions 10 does not always come into contact with the molten metal.

Mechanical strength is required along with thermal shock resistance for the lower portion R3 of the first wall portion 10, which is likely to be in contact with the molten metal. This is required, for example, to withstand the weight of contents such as the molten metal. In contrast, mechanical strength is not necessarily required for the upper portion R1 located on the opening portion 30 side of the first wall portion 10, but a particularly high thermal shock resistance is required. As in the heat-resistant container 1 according to the embodiment, the porosity Pr2 on the opening portion 30 side of the first wall portions 10 is greater than the porosity Pr2 on the second wall portion 20 side, so that the thermal shock resistance on the opening portion 30 side can be improved accordingly. This improves the thermal shock resistance of the heat-resistant container 1 on the whole.

In the heat-resistant container 1 according to the embodiment, the porosity Pr1 in the inner portion R5 (see FIG. 2) of the first wall portion 10 is greater than the porosity Pr1 in the inner wall surface side portion R4 (see FIG. 2) of the first wall portion 10.

For example, when the molten metal is introduced into the heat-resistant container 1, the inner wall surface side portion R4 of the first wall portion 10 comes to be in direct contact with the molten metal and receives a larger thermal shock than the inner portion R5. In contrast, since the porosity Pr1 in the inner wall surface side portion R4 is greater than the porosity Pr1 in the inner portion R5, the heat-resistant container 1 according to the embodiment can have an improved thermal shock resistance at the inner wall surface side portion R4. In addition, the porosity Pr1 in the inner portion R5 is smaller than the porosity Pr1 in the inner wall surface side portion R4, so that the inner portion R5 can have an improved mechanical strength better than the inner wall surface side portion R4, thus improving the overall mechanical strength.

An average equivalent circle diameter of the pores P1 (see FIG. 4) is referred to as"Pd1", and an average equivalent circle diameter of the pores P2 (see FIG. 5) is referred to as "Pd2". In the heat-resistant container 1 according to the embodiment, the average equivalent circle diameter Pd1 of the pores P1 is smaller than the average equivalent circle diameter Pd2 of the pores P2.

Relatively, heat does not transfer easily due to the pores P1 in the interior of the heat-resistant container 1, and heat transmits through the interior of the heat-resistant container 1 by bypassing the pores P1. The following is a comparison of the heat transfer around the pores P1 having a small equivalent circle diameter and the pores P1 having a large equivalent circle diameter. That is, the pores P1 having a small equivalent circle diameter allow heat to transmit easily through the ceramic around the pores P1, and thus in the height direction of the first wall portions 10. On the other hand, the pores P1 having a large equivalent circle diameter do not allow heat to transfer easily in the ceramic around the pores P1, so that the heat cannot transfer easily in the thickness direction of the first wall portions 10. This improves the thermal shock resistance of the heat-resistant container 1 according to the embodiment.

An average distance between gravity centers of the pores P1 (see FIG. 4) is referred to as "Pw1", and an average distance between gravity centers of the pores P2 (see FIG. 5) is referred to as "Pw2." In the heat-resistant container 1 according to the embodiment, when an exclusion area is 30 $\mu m^2$ or more, the average distance Pw2 between the gravity centers of the pores P2 is shorter than the average distance Pw1 between the gravity centers of the pores P1. Here, "exclusion area" means an area excluding pores having an area less than a certain area. In other words, "exclusion area" means the area when only the pores having an area equal to or larger than a certain area are the target pores to be measured. For example, an exclusion area of 30 $\mu m^2$ means that only pores having an area of 30 $\mu m^2$ or more are extracted and calculated.

The shorter the distance between the gravity centers of the pores P2, the less the heat transfers. On the contrary, a longer distance between gravity centers of the pores P2 allows for more heat transfer. With a long average distance Pw1 between the gravity centers of the pores P1, heat transfers easily in the height direction of the first wall portion 10. On the other hand, with a short average distance Pw2 between the gravity centers of the pores P2, heat is less likely to transfer in the thickness direction of the first wall portion 10. Thus, with Pw2 shorter than Pw1, heat tends to transfer easily in the height direction, and is less likely to be transferred in the thickness direction. This can further improve the thermal shock resistance of the heat-resistant container 1.

An average aspect ratio of the pores P1 (see FIG. 4) in the upper portion R1 (see FIG. 2) of the first wall portion 10 is referred to as Pa1, and an average aspect ratio of the pores P2 (see FIG. 5) in the upper portion R1 is referred to as Pa2. In the heat-resistant container 1 according to the embodiment, the average value Pa1 is smaller than the average value Pa2. This improves the thermal shock resistance of the heat-resistant container 1 according to the embodiment.

Here, the aspect ratio is obtained by dividing a long diameter by a short diameter of a pore. The long diameter is the length of the longest portion of the target pore, and the short diameter is the length of the longest portion perpendicular to the long diameter.

For example, the following may be a reason for the improved thermal shock resistance. That is, in general, the smaller the Young's modulus of ceramics, the better the thermal shock resistance. Young's modulus is smaller for smaller bulk densities. However, in the case of ceramics, a low bulk density may reduce mechanical strength. Therefore, increasing the aspect ratio of the pores improves mechanical strength and thermal shock resistance while maintaining the low bulk density. The average aspect ratio Pa1 of the pores P1 in the upper portion R1 of the first wall portion 10 can be increased in order to decrease the Young's modulus in the height direction of the first wall portion 10. The small Young's modulus in the height direction of the first wall portion 10 suppresses propagation of cracks in the height direction of the first wall portion 10. Therefore, the heat-resistant container 1 can further improve thermal shock resistance.

Another reason for the improved thermal shock resistance may be as follows. That is, the upper portion R1 of the first wall portion 10 is open to the outside and is easily deformed by thermal expansion due to temperature changes in the heat-resistant container 1. This decreases the thermal stress in the thickness direction of the first wall portion 10 even when the heat-resistant container 1 is subjected to thermal shock, thus easily suppressing cracking in the upper portion R1. Therefore, even if the average aspect ratio Pa2 of the pores P2 is reduced, the thermal shock resistance is hardly reduced. In fact, propagation of cracks can be preferably suppressed by reducing the average value Pa2 and making the pores P2 have a near circular shape.

Preferably, the porosities Pr1, Pr2, the average distances between the gravity centers Pw1, Pw2, and the average aspect ratios Pa1, Pa2 are measured with respect to the pores P1, P2 that appear in the cross section having a cross-sectional area of 30 $\mu m^2$ or more, that is, the exclusion area of 30 $\mu m^2$. More preferably, the exclusion area is limited to 100 $\mu m^2$. More preferably, the exclusion area is limited to 150 $\mu m^2$.

Preferably, the upper limit of the cross-sectional area of the pores P1, P2 is 800 $\mu m^2$. This is because the presence of relatively large pores P1, P2 having a cross-sectional area exceeding 800 $\mu m^2$ causes concentration of thermal stress in such large pores P1, P2, which may cause a decrease in the mechanical strength and the thermal shock resistance as well.

The porosities Pr1, Pr2 are preferably in a range from 1 to 14%. Furthermore, the average distances between the gravity centers Pw1 and Pw2 are preferably in a range from 40 to 200 $\mu m$.

EXAMPLES

Manufacturing Method

First, alumina powder was mixed with silicon dioxide ($SiO_2$) powder, magnesium oxide (MgO) powder and calcium carbonate ($CaCO_3$) powder as known sintering aids, water was added, and the mixture was subjected to wet-milling in a pulverizer to make a primary slurry.

A dispersing agent such as ammonium polyacrylate was added, and then the material was wet-milled. The content of the dispersing agent such as ammonium polyacrylate (PAA) solution was in a range from 0.02 to 0.5 parts by mass per 100 parts by mass of raw powder solids.

The solid content in the dispersing agent was in a range from 0.04 to 0.4 parts by mass with respect to 100 parts by mass of the raw powder solids, so that the porosity Pr1 of the inner portion of the first wall portion 10 can be greater than the porosity Pr1 of the inner wall surface side portion of the first wall portion 10.

Subsequently, an aqueous solution, for example, of polyvinyl alcohol, acrylic resin, or polyethylene glycol was added as a known organic binder (binder) to the primary slurry and mixed to make a secondary slurry. The total amount of alumina powder, silicon dioxide powder, magnesium oxide powder, and calcium carbonate powder was 100 parts by mass, and the water content in the secondary slurry was in a range from 30 to 80 parts by mass.

When the water content in the secondary slurry was in a range from 30 to 60 parts by mass and the press forming pressure was in a range from 70 to 170 MPa, the porosity Pr2 on the opening portion 30 side could be greater than the porosity Pr2 on the second wall portion 20 side. In addition, the average distance Pw2 between the gravity centers of the pores P2 could be shorter than the average distance Pw1 between the gravity centers of the pores P1. Furthermore, the average aspect ratio Pa1 of the pores P1 could be smaller than the average aspect ratio Pa2 of the pores P2.

Subsequently, the secondary slurry was subjected to spray drying in a spray dryer to produce granules. The rotational speed of the disc used in this process was in a range from 6000 to 10000 rpm. Thus, the average equivalent circle diameter Pd1 of the pores P1 could be smaller than the average equivalent circle diameter Pd2 of the pores P2.

Subsequently, the granules were subjected to press molding with a press machine to produce a container-shaped compact. At this time, the molding pressure of the press was in a range from 50 to 170 MPa. The press machine applied pressure during press molding in a direction parallel to the side walls of the first wall portions 10, that is, in the height direction. The obtained compact was then fired at a temperature in a range from 1300 to 1500° C.

The dimensions of the obtained heat-resistant container 1 were as follows. The outer wall surface of the second wall portion 20 was 27×44 mm, the outer sides of the opening portion 30 were 27×44 mm, the height of the outer wall surface of the first wall portions 10 was 20 mm, and the thickness of first wall portions 10 was 2 mm. The thermal shock resistance temperature of the obtained heat-resistant container 1 was 207° C.

Micrograph

The obtained heat-resistant container 1 was observed using a microscope, in which a mirror-polished cross section (that is, a vertical cross section as illustrated in FIG. 2) obtained by cutting the first wall portion 10 orthogonal to the wall surface thereof and parallel to the height direction thereof was observed. Similarly, the obtained heat-resistant container 1 was observed using a microscope, in which a mirror-polished cross section (that is, a horizontal cross section as illustrated in FIG. 3) obtained by cutting the first wall portion 10 orthogonal to the wall surface thereof and parallel to the width direction thereof was observed.

Figure 6:
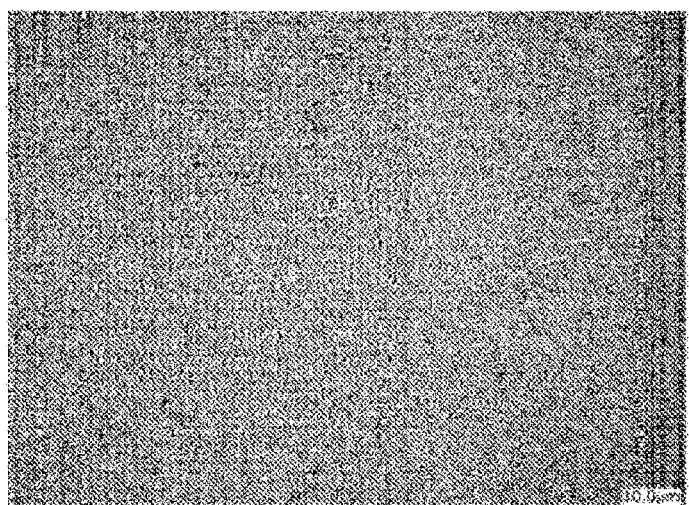
FIG. 6 is an observation photograph of the vertical cross section of a first wall portion of the heat-resistant container according to the embodiment.
Figure 7:
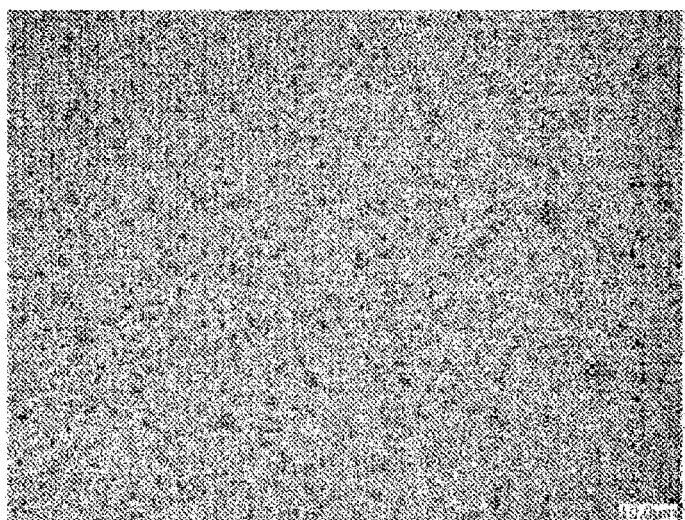
FIG. 7 is an observation photograph of the horizontal cross section of the first wall portion of the heat-resistant container according to the embodiment.

FIG. 6 is an observation photograph of the vertical cross section of the first wall portion 10 of the heat-resistant container 1 according to the example. FIG. 7 is an observation photograph of the horizontal cross section of the first wall portion 10 of the heat-resistant container 1 according to the example.

As illustrated in FIGS. 6 and 7, it can be seen that, in the heat-resistant container 1 according to the example, the porosity Pr1 (see FIG. 6) is smaller than the porosity Pr2 (see FIG. 7). It can also be seen that the heat-resistant container 1 according to the example has the pores P1 (see FIG. 6) which are smaller overall than the pores P2 (see FIG. 7). In other words, it can be seen that the equivalent circle diameter of the pores P1 is smaller than the average equivalent circle diameter Pd2 of the pores P2.

Measurement Results of Porosity, Distance Between Gravity Centers, Aspect Ratio, and the Like The porosity, the distance between gravity centers, the aspect ratio, and the like of the heat-resistant container 1 according to the example were measured based on the microscopic photographs. The results are shown in FIGS. 8 and 9. FIG. 8 is a table showing measurement results of aspect ratio, porosity, distance between gravity centers, degree of circularity, and equivalent circle diameter of the vertical cross section of the first wall portion 10. FIG. 9 is a table showing measurement results of aspect ratio, porosity, distance between gravity centers, degree of circularity, and equivalent circle diameter of the horizontal cross section of the first wall portion 10.

First, each observation surface (cross section) was photographed using a microscope (for example, VHX-5000 digital microscope from KEYENCE CORPORATION) at 500× magnification. Image analysis software "Azo-kun" (trade name of Asahi Kasei Engineering Corporation. When the image analysis software "Azo-kun" is used hereinafter, it indicates any image analysis software manufactured by Asahi Kasei Engineering Corporation) was used to analyze the area of the photograph taken in a range from 200000 $\mu m^2$ to 800000 $\mu m^2$, for example.

The aspect ratio can be calculated, for example, by analyzing the image using a technique called particle analysis of the image analysis software "Azo-kun." For the average aspect ratio, for example, the pores are regarded as particles for measurement purposes, and a "particle analysis" technique is applied to measure the maximum length and minimum width of individual pores. The average value is obtained by averaging the maximum length of the individual pores divided by the minimum width.

The porosity can be determined, for example, by applying a particle analysis method of the image analysis software "Azo-kun" to determine the ratio of the total area of pores to the total measurement area (area ratio (%)).

The distance between gravity centers can be calculated, for example, by applying a dispersion measurement method of the image analysis software "Azo-kun" to analyze images. Here, one example of the analysis conditions of the image analysis software "Azo-kun" is: brightness of particles is "dark," binarization method is "automatic," area of small figure removal is "0.1 $\mu m$," noise removal filter is "yes", binarized image correction is "linear separation", and display method is "overlay".

Although the example of using the image analysis software "Azo-kun" is described here, the image analysis software is not limited to "Azo-kun". In addition to the image analysis software "Azo-kun", commercially available analysis software and publicly available free software can be used as the analysis software. Other measurement methods commonly known in the art may be used.

Here, the exclusion area of 0 $(\mu m)^2$ means that all pores P1 and P2 that appear in the cross section are measured. The exclusion area of 30 $(\mu m)^2$ means that P1 and P2 having a cross-sectional area of less than 30 $(\mu m)^2$ are excluded from the measurement target among all pores P1 and P2 that appear in the cross section. The exclusion area of 100 $(\mu m)^2$ means that P1 and P2 having a cross-sectional area of less than 100 $(\mu m)^2$ are excluded from the measurement target among all pores P1 and P2 that appear in the cross section.

As shown in FIG. 8, when the exclusion area is 0 $(\mu m)^2$, the porosity Pr1 of the first wall portion 10 in the height direction (vertical cross section) is, for example, 4.3% in the inner wall surface side portion R4 of the upper portion R1, 5.2% in the inner portion R5 of the upper portion R1, and 4.7% in the outer wall surface side portion R6 of the upper portion R1. The average value of these values, that is, the average porosity Pr1 in the upper portion R1 is 4.7%. In contrast, as shown in FIG. 9, the porosity Pr2 of the first wall portion 10 in the width direction (horizontal cross section) when the exclusion area is 0 $(\mu m)^2$ is 10.3% in the inner wall surface side portion R4 of the upper portion R1, 11.4% in the inner portion R5 of the upper portion R1, and 11.3% in the outer wall surface side portion R6 of the upper portion R1. The average value of these values, that is, the average porosity Pr2 in the upper portion R1 is 11.0%.

Thus, it can be seen that the porosity Pr1 in the upper portion R1 of the first wall portion 10 is smaller than the porosity Pr2 in the upper portion R1 of the first wall portion 10 for all regions of the inner wall surface side portion R4, the inner portion R5, and the outer wall surface side portion R6. This trend is also true for the lower portion R3 and the center portion R2 of the first wall portion 10. That is, it can be seen that the porosity Pr1 is smaller than the porosity Pr2 in all regions of the first wall portion 10. This trend is more pronounced with larger exclusion areas.

For example, a possible reason for the porosity Pr1 being smaller than the porosity Pr2 may be as follows. Specifically, the addition of a certain amount of dispersing agent causes a large void to be formed inside the granules formed by spray drying. These voids easily collapse in the pressurization direction during molding, and a large number of collapsed (deformed) voids are formed in the molded compact in the pressurization direction. Numerous collapsed voids remain collapsed during firing. However, the crushed granules do not remain intact in the sintered body, and the shape of the crushed voids changes as the ceramic granules are sintered. Even with this change, the crushed shape of the pores (originally collapsed voids) in the sintered body remains in the direction from the upper wall to the opening portion (pressurization direction). As a result, the porosity Pr1 is considered to be smaller than the porosity Pr2.

As shown in FIG. 8, comparing the porosity Pr1 in the inner wall surface side portion R4 and the porosity Pr1 in the inner portion R5 of the porosity Pr1 of the first wall portion 10 in the height direction (horizontal cross section vertical cross section) when the exclusion area is 0 $(\mu m)^2$, the porosity Pr1 in the inner portion R5 is greater than the porosity Pr1 in the inner wall surface side portion R4 for all of the upper portion R1, the center portion R2, and the lower portion R3 of the first wall portion 10. In addition, the porosity Pr1 in the inner portion R5 is greater than the porosity Pr1 in the outer wall surface side portion R6 for all of the upper portion R1, the center portion R2, and the lower portion R3 of the first wall portion 10. These trends are the same as, and/or similar to, the case in which the exclusion area is 30 $(\mu m)^2$.

Thus, the porosity Pr1 in the inner portion R5 of the first wall portion 10 is greater than the porosity Pr1 in the inner wall surface side portion R4 of the first wall portion 10.

As shown in FIG. 9, among the porosities Pr2 of the first wall portion 10 in the width direction (horizontal cross section) when the exclusion area is 0 $(\mu m)^2$, the porosities Pr2 are respectively 10.3% in the inner wall surface side portion R4, 11.4% in the inner portion R5, and 11.3% in the outer wall surface side portion R6 of the upper portion R1. The average value of these values is 11.0%. In contrast, among the porosities Pr2 of the first wall portions 10 in the width direction (horizontal cross section) when the exclusion area is 0 $(\mu m)^2$, the porosities Pr2 are respectively 10.0% in the inner wall surface side portion R4, 10.9% in the inner portion R5, and 11.0% in the outer wall surface side portion R6 of the lower portion R3. The average value of these values is 10.6%.

Thus, it can be seen that the porosity Pr2 in the upper portion R1 which is the region on the opening portion side of the first wall portion 10 is greater than the porosity Pr2 in the lower portion R3 which is the region on the second wall portion 20 side of the first wall portion 10. This trend is more pronounced with larger exclusion areas.

As shown in FIG. 8, when the exclusion area is 30 $(\mu m)^2$, the average distance Pw1 between the gravity centers in the height direction (vertical cross section) of the pores P1 is 53.7 $\mu m$ in the upper portion R1, 54.8 $\mu m$ in the center portion R2, and 53.3 $\mu m$ in the lower portion R3 of the first wall portion 10. In contrast, as shown in FIG. 9, when the exclusion area is 30 $(\mu m)^2$, the average distance Pw2 between the gravity centers in the width direction (horizontal cross section) of the pores P2 is 37.3 $\mu m$ in the upper portion R1, 33.7 $\mu m$ in the center portion R2, and 34.2 $\mu m$ in the lower portion R3 of the first wall portion 10.

Thus, it can be seen that, when the exclusion area is 30 $(\mu m)^2$, the average distance Pw2 between the gravity centers of the pores P2 is shorter than the average distance Pw1 between the gravity centers of the pores P1.

As shown in FIG. 8, when the exclusion area is 30 $(\mu m)^2$, the average equivalent circle diameter Pd1 of the pores P1 in the height direction (vertical cross section) is 9.30 $\mu m$ in the upper portion R1, 8.90 $\mu m$ in the center portion R2, and 10.40 $\mu m$ in the lower portion R3 of the first wall portion 10. In contrast, as shown in FIG. 9, when the exclusion area is 30 $(\mu m)^2$, the average equivalent circle diameter Pd2 of the pores P2 in the width direction (horizontal cross section) is 12.70 $\mu m$ in the upper portion R1, 11.30 $\mu m$ in the center portion R2, and 11.50 $\mu m$ in the lower portion R3 of the first wall portion 10.

Thus, it can be seen that the average equivalent circle diameter Pd1 of the pores P1 is smaller than the average equivalent circle diameter Pd2 of the pores P2.

As shown in FIG. 8, when the exclusion area is 30 $(\mu m)^2$, the average aspect ratio Pa1 in the height direction (vertical cross section) is 1.45 in the upper portion R1 of the pores P1. In contrast, as shown in FIG. 9, when the exclusion area is 30 $(\mu m)^2$, the average aspect ratio Pa2 in the width direction (horizontal cross section) is 1.47 $\mu m$ in the upper portion R1 of the pores P2.

Thus, it can be seen that the average aspect ratio Pa1 of the pores P1 in the upper portion R1 of first wall portion 10 is smaller than the average aspect ratio Pa2 of the pores P2 in the upper portion R1 of the first wall portion 10.

As described above, the heat-resistant container according to the embodiment (for example, the heat-resistant container 1) includes the first wall portions constituting the sidewalls (for example, the first wall portions 10), and the second wall portion constituting the upper wall or bottom wall (for example, the second wall portion 20). The first wall portions and the second wall portion are made of a ceramic. The first wall portions have a large number of pores therein. In the cross sections of the first wall portions, the porosity Pr1 is smaller than the porosity Pr2, where Pr1 is the porosity in the cross section of the first wall portion orthogonal to the wall surface thereof and parallel to the height direction thereof, and Pr2 is the porosity in the cross section of the first wall portion orthogonal to the wall surface thereof and parallel to the width direction thereof.

In the cross sections of the first wall portions, the average equivalent circle diameter Pd1 is smaller than the average equivalent circle diameter Pd2, where Pd1 is the average equivalent circle diameter of the pores (for example, the pores P1) that appear in the cross section orthogonal to the wall surface thereof and parallel to the height direction thereof, and the average equivalent circle diameter Pd2 of the pores (for example, the pores P2) that appear in the cross-section orthogonal to the wall surface thereof and parallel to the width direction thereof.

Thus, the heat-resistant container according to the embodiment has excellent thermal shock resistance.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:
1. A heat-resistant container, comprising:
a first wall portion constituting a side wall; and a second wall portion constituting an upper wall or a bottom wall, wherein
the first wall portion and the second wall portion are made of a ceramic,
the first wall has a plurality of pores therein,
in cross sections of the first wall portion, Pr1 is smaller than Pr2, where Pr1 is a porosity in a cross section of the first wall portion orthogonal to a wall surface of the first wall portion and parallel to a height direction of the first wall portion, and Pr2 is a porosity in a cross section of the first wall portion orthogonal to the wall surface of the first wall portion and parallel to a width direction of the first wall portion.

2. The heat-resistant container according to claim 1, wherein the first wall portion has an upper portion farther from the second wall portion and a lower portion closer to the second wall portion, and the Pr2 in the upper portion of the first wall portion is greater than the Pr2 in the lower portion of the first wall portion.

3. The heat-resistant container according to claim 1, wherein the first wall portion has an inner wall surface side portion, an outer wall surface side portion, and an inner portion between the inner wall surface side portion and the outer wall surface side portion, and Pr1 is greater in the inner portion of the first wall portion than on the inner wall surface side portion of the first wall portion.

4. A heat-resistant container, comprising:
a first wall portion constituting a side wall; and
a second wall portion constituting an upper wall or a bottom wall, wherein
the first wall portion and the second wall portion are made of a ceramic,
the first wall portion has a plurality of pores therein, and
in cross-sections of the first wall portion, Pd1 is smaller than Pd2, where Pd1 is an average equivalent circle diameter of the pores that appear in a cross section of the first wall portion orthogonal to a wall surface of the first wall portion and parallel to a height direction of the first wall portion, and Pd2 is an average equivalent circle diameter of the pores that appear in a cross section of the first wall portion orthogonal to the wall surface of the first wall portion and parallel to a width direction of the first wall portion.

5. The heat-resistant container according to claim 1, wherein
in the cross sections of the first wall portion, Pw2 is shorter than Pw1, where Pw1 is an average distance between gravity centers of the pores that appear in the cross section of the first wall portion orthogonal to the wall surface of the first wall portion and parallel to the height direction of the first wall portion, and Pw2 is an average distance between gravity centers of the pores that appear in the cross section of the first wall portion orthogonal to the wall surface of the first wall portion and parallel to the width direction of the first wall portion.

6. The heat-resistant container according to claim 1, wherein
the second wall portion has a quadrangular shape in plan view, and
the heat-resistant container includes four of the first wall portions connected to the second wall portion.

7. The heat-resistant container according to claim 1, wherein
a main component of the ceramic is alumina.

8. The heat-resistant container according to claim 4, wherein in the cross sections of the first wall portion, Pw2 is shorter than Pw1, where Pw1 is an average distance between gravity centers of the pores that appear in the cross section of the first wall portion orthogonal to the wall surface of the first wall portion and parallel to the height direction of the first wall portion, and Pw2 is an average distance between gravity centers of the pores that appear in the cross section of the first wall portion orthogonal to the wall surface of the first wall portion and parallel to the width direction of the first wall portion.

9. The heat-resistant container according to claim 4, wherein the second wall portion has a quadrangular shape in plan view, and the heat-resistant container includes four of the first wall portions connected to the second wall portion.

10. The heat-resistant container according to claim 4, wherein a main component of the ceramic is alumina.

* * * * *